Patented July 19, 1927.

1,636,300

UNITED STATES PATENT OFFICE.

OTTO GEWALT, OF GOTTENBORG, SWEDEN.

METHOD FOR IMPROVING THE QUALITIES OF COFFEE.

No Drawing.  Application filed July 16, 1926. Serial No. 123,017.

It is known, that some species of coffee have a rather bad smell and taste, so that they can not be satisfactorily used by people with reasonable demands of the quality of the drink. These undesirable features depend on some characteristics of the coffee in question.

This invention has for its object to remove said disagreeable properties and to restore the good quality of such coffee.

For that purpose I submit the coffee to rather low temperatures by means of which method coffee which otherwise was almost nonsaleable in the market, attains the character of good coffee.

When carrying the invention into effect I place the fresh coffee beans into a closed compartment in which the temperature is lowered down to a suitable degree or preferably below the freezing point of water, and I leave the coffee in this state for a certain period such as a predetermined number of hours sufficient to remove the bad smell and taste. When removing the coffee from the cooling room the same has been freed from the bad smell and taste and can be sold as well as the best kinds of coffee.

Under certain circumstances it is not necessary to treat the coffee in a fresh state but it can be treated in dried and roasted state, but I prefer to carry out the method on green coffee.

How low the temperature may be kept and for how long a period the coffee may be submitted to the decreased temperature belongs to the existent circumstances such as the sort of the coffee and other reasons. As an average example I can mention a temperature of some 8 to 10 centigrades below zero and a duration of the treatment of some 48 hours, but I do not want to limit myself to these figures. Experience has shown, that sometimes the temperature can be held considerable higher. Also the duration can be reduced to some 24 hours or less as also in other cases be extended for more than 48 hours.

What I claim is:

1. A method for improving qualities of coffee comprising the submitting of coffee to a temperature below the freezing point of water during a predetermined period of a plurality of hours sufficient to remove the bad smell and taste from the coffee.

2. A method for improving the quality of coffee comprising the submitting of green coffee to a temperature of approximately eight centigrades below zero during a period of time ranging from twenty-four to forty-eight hours.

3. A method for improving the qualities of coffee comprising the submitting of coffee to a temperature below the freezing point of water during a period of more than 24 hours.

4. A method for improving the quality of coffee comprising the submitting of green coffee to a temperature of approximately eight centigrades below zero during a period of approximately forty-eight hours.

In testimony whereof I have affixed my signature.

OTTO GEWALT.